United States Patent
Adden et al.

(10) Patent No.: US 10,577,432 B2
(45) Date of Patent: Mar. 3, 2020

(54) CELLULOSE ETHER POWDERS

(71) Applicant: Dow Global Technologies LLC, Midland, MI (US)

(72) Inventors: Roland Adden, Bomlitz (DE); Tirtha Chatterjee, Midland, MI (US); Matthias Knarr, Weser (DE); Meinolf Brackhagen, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 178 days.

(21) Appl. No.: 15/574,497

(22) PCT Filed: May 26, 2016

(86) PCT No.: PCT/US2016/034219
§ 371 (c)(1),
(2) Date: Nov. 16, 2017

(87) PCT Pub. No.: WO2016/196152
PCT Pub. Date: Dec. 8, 2016

(65) Prior Publication Data
US 2018/0134812 A1    May 17, 2018

Related U.S. Application Data

(60) Provisional application No. 62/171,306, filed on Jun. 5, 2015.

(51) Int. Cl.
*C08B 11/20* (2006.01)
*B01J 2/04* (2006.01)

(52) U.S. Cl.
CPC ............... *C08B 11/20* (2013.01); *B01J 2/04* (2013.01)

(58) Field of Classification Search
None
See application file for complete search history.

(56) References Cited

U.S. PATENT DOCUMENTS

| | | | |
|---|---|---|---|
| 6,235,893 B1 | 5/2001 | Reibert et al. | |
| 8,623,840 B2 | 1/2014 | Adden et al. | |
| 2001/0025101 A1 | 9/2001 | Schlesiger et al. | |
| 2001/0034441 A1 | 10/2001 | Schlesiger et al. | |
| 2005/0236121 A1 | 10/2005 | Kondo et al. | |
| 2008/0207893 A1* | 8/2008 | Berglund | A61K 47/38 536/86 |
| 2009/0306364 A1 | 12/2009 | Beer et al. | |
| 2012/0015924 A1* | 1/2012 | Friesen | B01J 2/04 514/180 |
| 2013/0165371 A1* | 6/2013 | Dobry | B01J 2/04 514/5.9 |
| 2015/0045320 A1 | 2/2015 | Adden et al. | |
| 2015/0057356 A1 | 2/2015 | Grasman et al. | |
| 2015/0057358 A1 | 2/2015 | Brackhagen et al. | |
| 2015/0065547 A1 | 3/2015 | Schmitt et al. | |
| 2015/0065548 A1 | 3/2015 | Adden et al. | |
| 2015/0202301 A1 | 7/2015 | Petermann et al. | |
| 2015/0218198 A1 | 8/2015 | Petermann et al. | |
| 2015/0230500 A1 | 8/2015 | Guo et al. | |

FOREIGN PATENT DOCUMENTS

| WO | 2008050209 A1 | 5/2008 |
| WO | 2011139763 A1 | 11/2011 |
| WO | WO2013/059064 * | 4/2013 |
| WO | WO 2013/154980 * | 10/2013 |
| WO | 2014168917 A1 | 10/2014 |

OTHER PUBLICATIONS

Bayer, et al., "Thermal precipitation or gelling behaviour of dissolved methylcellulose (MC) derivatives—Behaviour in water and influence on the extrusion of ceramic pastes. Part 1: Fundamentals of MC-derivatives", J. EP Ceramic Society, vol. 32, pp. 1007-1018 (2012).

* cited by examiner

*Primary Examiner* — Mary Lynn F Theisen

(57) ABSTRACT

Provided is a method of making methylcellulose-type ether in powder form, said method comprising
  (a) providing a solution of said methylcellulose-type ether in water, and
  (b) then separating said methylcellulose-type ether from said water to produce dried methylcellulose-type ether, with the proviso that either
    (i) step (b) produces said methylcellulose-type ether in powder form, or
    (ii) after step (b), said method additionally comprises a step (c) of subjecting said dried methylcellulose-type ether to mechanical stress to produce said methylcellulose-type ether in powder form.

5 Claims, 2 Drawing Sheets

CELLULOSE ETHER POWDERS

Figure 1:
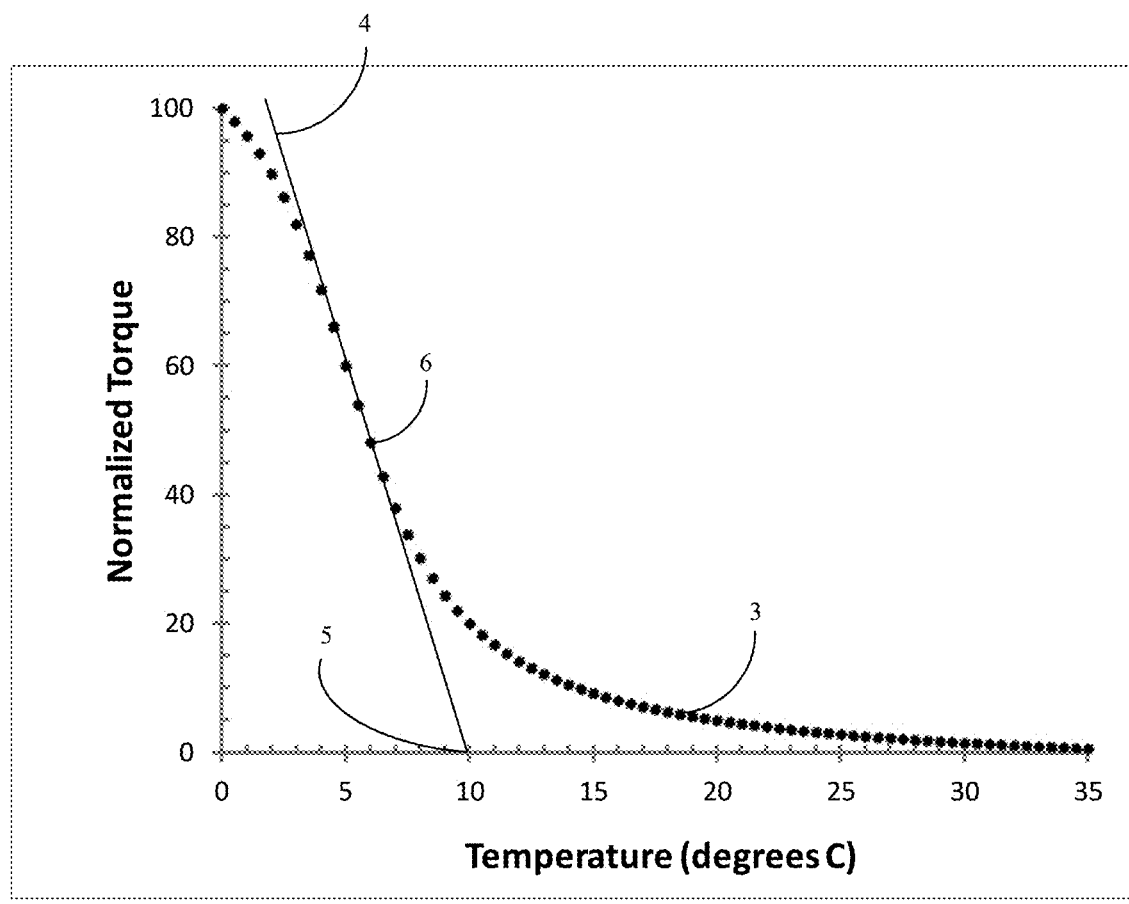

Methylcellulose-type ethers are useful for a wide variety of purposes. Methylcellulose-type ethers are normally manufactured in the form of powders, and for most purposes, it is desirable to dissolve the powder in water. However, many methylcellulose-type ethers have powder dissolution temperature of 25° C. or below. To dissolve such methylcellulose-type ethers in water requires cooling equipment, which adds complexity and expense to the process of using the methylcellulose-type ether. It is desired to find a method to raise the powder dissolution temperature of such a methylcellulose-type ether and to find methylcellulose-type ether powders that are made by such a method.

WO 2008/050209 describes a method of making hydroxypropyl methyl cellulose hard capsules. The method described by WO 2008/050209 involves dispersing HPMC in water at temperature preferably above 60° C.; cooling the dispersion below room temperature to achieve solubilization of the HPMC; then using the resulting aqueous composition in a dip coating process to produce capsules. It is desired to find a method of producing methylcellulose-type ethers in a powder form that has powder dissolution temperature that is higher than previously known powders of methylcellulose-type ethers of the same chemical composition.

The following is a statement of the invention.

A first aspect of the present invention is a method of making methylcellulose-type ether in powder form, said method comprising (a) providing a solution of said methylcellulose-type ether in water, and (b) then separating said methylcellulose-type ether from said water to produce dried methylcellulose-type ether, with the proviso that either (i) step (b) produces said methylcellulose-type ether in powder form, or (ii) after step (b), said method additionally comprises a step (c) of subjecting said dried methylcellulose-type ether to mechanical stress to produce said methylcellulose-type ether in powder form.

A second aspect of the present invention is a composition in powder form comprising methylcellulose, wherein said composition has a powder x-ray diffraction spectrum at source x-ray wavelength 1.789 Å showing a peak at a 2θ value between 14.5 and 16.5 degrees having intensity level Ipeak and a trough at a 2θ value between 16.51 and 20 degrees having intensity level Itrough, wherein a peak index PIndex is defined as PIndex=(Ipeak−Itrough)/Itrough and wherein said PIndex is 0.01 or greater.

The following is a detailed description of the invention.

As used herein, the following terms have the designated definitions, unless the context clearly indicates otherwise.

Methylcellulose-type (MCT) ether is a category of derivatives of cellulose. The members of the category of MCT ethers are methylcellulose (MC) polymer and hydroxyalkyl methylcellulose (HAMC) polymers.

Methylcellulose (MC) polymer has repeat units of structure I, known as an anhydroglucose unit:

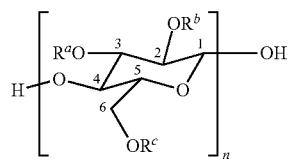

In structure I, the repeat unit is shown within the brackets. The index n is sufficiently large that structure I is a polymer. —$R^a$, —$R^b$, and —$R^c$ is each independently chosen from —H and —$CH_3$. The choice of —$R^a$, —$R^b$, and —$R^c$ may be the same in each repeat unit, or different repeat units may have different choices of —$R^a$, —$R^b$, and —$R^c$. One or more repeat units has one or more of —$R^a$, —$R^b$, and —$R^c$ that is —$CH_3$. Each of the numerals 1 to 6 shown in structure 1 is a position label corresponding to the carbon atom adjacent to the numeral.

Methylcellulose polymer is characterized by the weight percent of methoxyl groups. The weight percentages are based on the total weight of the methylcellulose polymer. By convention, the weight percent is an average weight percentage based on the total weight of the cellulose repeat unit, including all substituents. The content of the methoxyl group is reported based on the mass of the methoxyl group (i.e., —OCH3). The determination of the % methoxyl in methylcellulose (MC) polymer is carried out according to the United States Pharmacopeia (USP 37, "Methylcellulose", pages 3776-3778).

Methylcellulose polymer is also characterized by the viscosity of a 2 wt.-% solution in water at 5° C. The steady-shear-flow viscosity (5° C., 10 s$^{-1}$, 2 wt. % MC) of aqueous 2-wt. % methylcellulose solutions were measured at 5° C. at a shear rate of 10 s$^{-1}$ with an Anton Paar Physica MCR 501 rheometer and cone-and-plate sample fixtures (CP-50/1, 50-mm diameters). The viscosity thus determined is known herein as the "2% solution viscosity at 5° C."

Methylcellulose may also be characterized by the quotient s23/s26. The quantity s23 is the molar fraction of anhydroglucose units in which the two hydroxy groups in the 2- and 3-positions are substituted with methyl groups and the 6-positions are unsubstituted hydroxy groups. The quantity s26 is the molar fraction of anhydroglucose units in which the two hydroxy groups in the 2- and 6-positions are substituted with methyl groups and the 3-positions are unsubstituted hydroxy groups. The quotient s23/s26 is found by dividing s23 by s26.

The determination of ether substituents in cellulose ethers is generally known and e.g., described in *Carbohydrate Research*, 176 (1988) 137-144, Elsevier Science Publishers B.V., Amsterdam, DISTRIBUTION OF SUBSTITUENTS IN O-ETHYL-O-(2-HYDROXYETHYL)CELLULOSE by Bengt Lindberg, Ulf Lindquist, and Olle Stenberg.

Specifically, determination of s23/s26 is conducted as follows:

10-12 mg of the cellulose ether are dissolved in 4.0 mL of dry analytical grade dimethyl sulfoxide (DMSO) (Merck, Darmstadt, Germany, stored over 0.3 nm molecular sieve beads) at about 90° C. under stirring and then cooled down to room temperature again. The solution is left stirring at room temperature over night to ensure complete solubilization. The entire reaction including the solubilization of the cellulose ether is performed using a dry nitrogen atmosphere in a 4 mL screw cap vial. After solubilization the dissolved cellulose ether is transferred to a 22 mL screw cap vial.

Powdered sodium hydroxide (freshly pestled, analytical grade) and ethyl iodide (for synthesis, stabilized with silver) in a thirty fold molar excess of the reagents sodium hydroxide and ethyl iodide per hydroxyl group of the anhydroglucose unit are added and the solution is vigorously stirred under nitrogen in the dark for three days at ambient temperature. The perethylation is repeated with addition of the threefold amount of the reagents sodium hydroxide and ethyl iodide compared to the first reagent addition and further stirring at room temperature for additional two days. Optionally the reaction mixture can be diluted with up to 1.5 mL DMSO to ensure good mixing during the course of the reaction. 5 mL of 5% aqueous sodium thiosulfate solution is poured into the reaction mixture and the obtained solution is then extracted three times with 4 mL of dichloromethane. The combined extracts are washed three times with 2 mL of water. The organic phase is dried with anhydrous sodium sulfate (approximately 1 g). After filtration the solvent is removed in a gentle stream of nitrogen and the sample is stored at 4° C. until further sample preparation.

Hydrolysis of about 5 mg of the perethylated samples is performed under nitrogen in a 2 mL screw cap vial with 1 mL of 90% aqueous formic acid under stirring at 100° C. for 1 hour. The acid is removed in a stream of nitrogen at 35-40° C. and the hydrolysis is repeated with 1 mL of 2M aqueous trifluoroacetic acid for 3 hours at 120° C. in an inert nitrogen atmosphere under stirring. After completion the acid is removed to dryness in a stream of nitrogen at ambient temperature using approximately 1 mL of toluene for co-distillation.

The residues of the hydrolysis are reduced with 0.5 mL of 0.5 M sodium borodeuteride in 2N aqueous ammonia solution (freshly prepared) for 3 hours at room temperature under stirring. The excess reagent is destroyed by drop wise addition of approximately 200 µL of concentrated acetic acid. The resulting solution is evaporated to dryness in a stream of nitrogen at approximately 35-40° C. and subsequently dried in vacuum for 15 min at room temperature. The viscous residue is dissolved in 0.5 mL of 15% acetic acid in methanol and evaporated to dryness at room temperature. This is done five times and repeated four times with pure methanol. After the final evaporation the sample is dried in vacuum overnight at room temperature.

The residue of the reduction is acetylated with 600 µL of acetic anhydride and 150 µL of pyridine for 3 hrs at 90° C. After cooling the sample vial is filled with toluene and evaporated to dryness in a stream of nitrogen at room temperature. The residue is dissolved in 4 mL of dichloromethane and poured into 2 mL of water and extracted with 2 mL of dichloromethane. The extraction is repeated three times. The combined extracts are washed three times with 4 mL of water and dried with anhydrous sodium sulfate. The dried dichloromethane extract is subsequently submitted to GC analysis. Depending on the sensitivity of the GC system, a further dilution of the extract can be necessary.

Gas-liquid (GLC) chromatographic analyses are performed with a gas chromatograph equipped with capillary columns 30 m length, 0.25 mm ID, and 0.25 µm phase layer thickness, 30 m, 0.25 mm ID, 0.25 µm phase layer thickness, operated with 1.5 bar helium carrier gas. (For example, using a for example using Hewlett Packard 5890A and 5890A Series II type of gas chromatographs equipped with J&W capillary columns DB5) The gas chromatograph is programmed with a temperature profile that holds constant at 60° C. for 1 min, heats up at a rate of 20° C./min to 200° C., heats further up with a rate of 4° C./min to 250° C., heats further up with a rate of 20° C./min to 310° C. where it is held constant for another 10 min. The injector temperature is set to 280° C. and the temperature of the flame ionization detector (FID) is set to 300° C. 1 µL of the samples is injected in the splitless mode at 0.5 min valve time. Data are acquired and processed, for example with a LabSystems Atlas work station.

Quantitative monomer composition data are obtained from the peak areas measured by GLC with FID detection. Molar responses of the monomers are calculated in line with the effective carbon number (ECN) concept but modified as described in the table below. The effective carbon number (ECN) concept has been described by Ackman (R. G. Ackman, *J. Gas Chromatogr.*, 2 (1964) 173-179 and R. F. Addison, R. G. Ackman, *J. Gas Chromatogr.*, 6 (1968) 135-138) and applied to the quantitative analysis of partially alkylated alditol acetates by Sweet et. al (D. P. Sweet, R. H. Shapiro, P. Albersheim, *Carbohyd. Res.*, 40 (1975) 217-225).

Quantitative monomer composition data are obtained from the peak areas measured by gas liquid chromatography (GLC) with flame ionization detector (FID) detection. Molar responses of the monomers are calculated in line with the effective carbon number (ECN) concept but modified as described in the table below. The effective carbon number (ECN) concept has been described by Ackman (R. G. Ackman, J. Gas Chromatogr., 2 (1964) 173-179 and R. F. Addison, R. G. Ackman, J. Gas Chromatogr., 6 (1968) 135-138) and applied to the quantitative analysis of partially alkylated alditol acetates by Sweet et. al (D. P. Sweet, R. H. Shapiro, P. Albersheim, Carbohyd. Res., 40 (1975) 217-225).

ECN increments used for ECN calculations:

| Type of carbon atom | ECN increment |
|---|---|
| hydrocarbon | 100 |
| primary alcohol | 55 |
| secondary alcohol | 45 |

In order to correct for the different molar responses of the monomers, the peak areas are multiplied by molar response factors MRFmonomer which are defined as the response relative to the 2,3,6-Me monomer. The 2,3,6-Me monomer is chosen as reference since it is present in all samples analyzed in the determination of s23/s26.

MRFmonomer=ECN2,3,6-Me/ECNmonomer

The mole fractions of the monomers are calculated by dividing the corrected peak areas by the total corrected peak area according to the following formulas:

$$s23=23\text{-Me}+23\text{-Me-6-HAMe}+23\text{-Me-6-HA}+23\text{-Me-6-HAHAMe}+23\text{-Me-6-HAHA}$$

and $$s26=26\text{-Me}+26\text{-Me-3-HAMe}+26\text{-Me-3-HA}+26\text{-Me-3-HAHAMe}+26\text{-Me-3-HAHA}]$$

where s23 is the sum of the molar fractions of anhydroglucose units which meet the following conditions:
  a) the two hydroxyl groups in the 2- and 3-positions of the anhydroglucose unit are substituted with methyl groups and the 6-position is not substituted (=23-Me);
  b) the two hydroxyl groups in the 2- and 3-positions of the anhydroglucose unit are substituted with methyl groups and the 6-position is substituted with methylated hydroxyalkyl (=23-Me-6-HAMe) or with a methylated side chain comprising 2 hydroxyalkyl groups (=23-Me-6-HAHAMe); and c) the two hydroxyl groups in the 2- and 3-positions of the anhydroglucose unit are substituted with methyl groups and the 6-position is substituted with hydroxyalkyl (=23-Me-6-HA) or with a side chain comprising 2 hydroxyalkyl groups (=23-Me-6-HAHA).

and where s26 is the sum of the molar fractions of anhydroglucose units which meet the following conditions:

a) the two hydroxyl groups in the 2- and 6-positions of the anhydroglucose unit are substituted with methyl groups and the 3-position is not substituted (=26-Me);

b) the two hydroxyl groups in the 2- and 6-positions of the anhydroglucose unit are substituted with methyl groups and the 3-position is substituted with methylated hydroxyalkyl (=26-Me-3-HAMe) or with a methylated side chain comprising 2 hydroxyalkyl groups (=26-Me-3-HAHAMe); and c) the two hydroxyl groups in the 2- and 6-positions of the anhydroglucose unit are substituted with methyl groups and the 3-position is substituted with hydroxyalkyl (=26-Me-3-HA) or with a side chain comprising 2 hydroxyalkyl groups (=26-Me-3-HAHA).

Hydroxyalkyl methylcellulose (HAMC) polymers have structure 1, with the various features of structure I as defined above for MC polymers except that —$R^a$—, —$R^b$—, and —$R^c$ is each independently chosen from —H, —$CH_3$, and structure II:

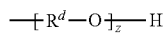

II

One or more repeat units has one or more of —$R^a$, —$R^b$, and —$R^c$ that is —$CH_3$. Also, one or more repeat units has one or more of —$R^a$, —$R^b$, and —$R^c$ that is structure II. The index z is 1 or larger. The index z may be the same or different in different occurrences of structure II on the same molecule of HAMC polymer. The group —$R^d$— is a bivalent alkyl group.

Hydroxypropyl methylcellulose (HPMC) polymer is an HAMC in which —$R^d$— has the structure III:

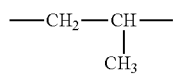

III

Hydroxypropyl methylcellulose polymer is characterized by the weight percent of methoxyl groups. The weight percentages are based on the total weight of the hydroxypropyl methylcellulose polymer. By convention, the weight percent is an average weight percentage based on the total weight of the cellulose repeat unit, including all substituents. The content of the methoxyl group is reported based on the mass of the methoxyl group (i.e., —$OCH_3$). The determination of the % methoxyl in hydroxypropyl methylcellulose polymer is carried out according to the United States Pharmacopeia (USP 37, "Hypromellose", pages 3296-3298).

Hydroxypropylmethylcellulose polymer is also characterized by the viscosity of a 2 wt.-% solution in water at 5° C. as described above for MC polymers.

Hydroxyethyl methylcellulose (HEMC) polymer is an HAMC in which —$R^d$— is —[CH2-CH2]-. Hydroxybutyl methylcellulose (HBMC) polymer is an HAMC in which —$R^d$— is a divalent alkyl group having 4 carbon atoms. HEMC polymer and HBMC polymer are characterized by the methods described above for HPMC polymer, with adaptations to account for the different —$R^d$— groups.

A composition is said herein to be a powder or, synonymously, to be in powder form, if the composition is solid at 25° C. and exists as a collection of particles. In the collection of particles, 0 to 2% by weight of the collection of particles consists of particles having any dimension of 2 mm or larger. In the collection of particles, the volume-average particle diameter is 1 mm or smaller. If a particle is not spherical, its diameter is considered herein to be equal to the diameter of a sphere having volume equal to the volume of the particle.

A composition labeled herein as MCT ether in powder form is a powder that contains MCT ether in an amount of 90% or more by weight based on the weight of the powder.

An MCT ether is said herein to be dissolved in water if the molecules of the MCT ether are intimately mixed with the molecules of a continuous liquid aqueous medium, and the continuous liquid aqueous medium contains 75% or more water by weight, based on the weight of the continuous liquid aqueous medium, excluding the weight of the MCT ether. When MCT ether is dissolved in water, a mixture is formed that contains MCT ether and water; the amount of MCT ether in that mixture is 30% or less by weight based on the weight of the mixture, and the mixture behaves as a liquid. MCT ether that is suspended in water is considered herein to be in a different form from MCT ether that is dissolved in water. MCT ether is considered suspended in water if particles of MCT ether having volume average diameter of 100 nm or larger are distributed throughout continuous liquid aqueous medium, and the continuous liquid aqueous medium contains 75% or more water by weight, based on the weight of the continuous liquid aqueous medium, excluding the weight of the MCT ether.

A sample of MCT ether that is in powder form is said herein to be dried if the sample of powder contains water in an amount of 0-15% by weight based on the weight of the sample of powder.

An MCT ether in powder form may be characterized by the powder dissolution temperature (PDT). When water is mixed with MCT ether in powder form, if the mixture is above the PDT, the MCT ether will not dissolve in the water. Only when the mixture is cooled below the PDT will the MCT ether dissolve in the water. MCT ethers in powder form normally have PDT below 50° C.

The PDT is determined as follows. Measurements may be made, for example, with a Haake RS1 rheometer.

A Cup (Couette) Z-34 geometry with a wing stirrer (the diameter and the height of the stirrer plate are 30 mm each; the wing plate has 4 perforations of 5 mm diameter). The amounts of water and cellulose ether are chosen to achieve a final concentration of 2%. 58.8 g of water is added into the cup and heated up to 70° C. At this temperature 1.2 g of the cellulose ether is slowly added. At this temperature the cellulose ether is insoluble and the suspension is stirred with 500 rpm for 60 sec. After a good suspension is achieved the temperature is decreased at a fixed cooling rate of 1° C./min, while stirring with 300 rpm. The torque is recorded with 4 data points/min. starting at 70° C. and ending at a temperature at least 20° C. lower than the estimated onset dissolution temperature, resulting in a torque build-up curve as function of temperature. For the further analysis of the onset dissolution temperature the data are normalized according to the following equation:

$$M_{norm} = \frac{M - M_i}{M_{max} - M_i}$$

where M represents the measured torque at a specific temperature, $M_i$ represents the start value of torque at the highest temperature (e.g., at 70° C.) at 300 rpm and $M_{max}$ represents the final torque at the lowest temperature (e.g., at 2° C.). For analysis of the onset dissolution temperature the values of torque (y-axis) are plotted against the temperature (x-axis). Linear regressions are performed to the obtained torque values for multiple temperature increments, each increment covering 2.5° C. An increment is started every 0.1° C. The linear regression with the largest slope is determined, and the point of intersection of that linear regression with the temperature axis is the PDT.

The method of determining PDT is illustrated by a hypothetical example in FIG. 1, which shows normalized torque measurements 3 versus temperature. The linear regression having highest slope is centered at point 6. The line 4 is determined by the linear regression having the highest slope. Line 4 intersects the temperature axis at point 5, and the temperature of point 5 is the PDT.

After a solution is made of MCT ether dissolved in water, the solution may show a gelation temperature. That is, for many MCT ethers, after the solution is made, if the temperature is then raised, the MCT ether will remain in solution, even above the PDT. If the temperature is raised further, for many MCT ethers, the solution will form a gel.

Formation of gel is assessed as follows. Aqueous MCT ether solutions were subjected to small-amplitude oscillatory shear flow (frequency=2 Hz, strain amplitude=0.5%) while warming from 5 to 85° C. at 1° C./min in a rotational rheometer (e.g., Anton Paar, MCR 501, with a Peltier temperature-control system). The oscillatory shear flow is applied to the sample placed between parallel-plate fixtures (50-mm diameter, 1-mm separation). Water loss to the sheared material is minimized during the temperature ramp by (1) covering the fixtures with a metal ring (inner diameter of 65 mm, width of 5 mm, height of 15 mm) and (2) placing a water-immiscible paraffin oil around the sample perimeter. The shear storage modulus G', which is obtained from the oscillation measurements, represents the elastic properties of the solution. The shear loss modulus G", which is obtained from the oscillation measurements, represents the viscous properties of the solution. At the lowest temperature, G' is less than G". As the temperature is raised, at some temperature the gelation process begins, and G' rises until it becomes equal to G". The gelation temperature, Tgel, is identified as the temperature at which G' and G" are equal.

In the practice of the present invention, preferred MCT ethers are those having Tgel of 30° C. or above; more preferably 32° C. or above; more preferably 35° C. or above. Preferred MCT ethers have Tgel of 41° C. or below; more preferably 39° C. or below; more preferably 37° C. or below.

Preferred MCT ethers have 2% solution viscosity as defined above of 2 mPa*s or higher; more preferably 10 mPa*s or above; more preferably 30 mPa*s or above; more preferably 100 mPa*s or above; more preferably 300 mPa*s or above; more preferably 1,000 mPa*s or above. Preferred MCT ethers have 2% solution viscosity as defined above of 20,000 mPa*s or below.

The method of the present invention involves the use of solution (a) of MCT ether in water. Preferably, this solution (a) is produced using starting materials that include an initial portion of MCT ether in powder form, where that MCT ether has never been dissolved in water. Such powders are known herein as "never-hydrated" MCT ether powders. Such powders are well known in the art; it is common for MCT ether to be made by a process in which cellulose is modified by converting —OH groups on the cellulose to —OCH$_3$ groups, and such a processes normally does not involve dissolving the MCT ether in water. The category of never-hydrated MCT ether powders includes MCT ether powders that may or may not have been swollen with water during their manufacture but does not include MCT ether powders that were ever dissolved in water. When an MCT ether powder is swollen with water, a mixture is formed that contains MCT ether powder and water; in that mixture, the amount of water is 40% or less by weight, based on the weight of the mixture. Also, that mixture behaves like a swollen solid and does not behave like a liquid.

Preferably, the never-hydrated MCT ether in powder form has PDT of 25° C. or below; more preferably 23° C. or below; more preferably 21° C. or below.

Preferably, the concentration of MCT ether in solution (a) is, by weight based on the weight of the solution, 0.2% or more; more preferably 0.5% or more; more preferably 1% or more. Preferably, the concentration of MCT ether in solution (a) is, by weight based on the weight of the solution, 15% or less; more preferably 12% or less; more preferably 9% or less; more preferably 6% or less.

Preferably solution (a) is made by forming a mixture that contains water and never-hydrated MCT ether powder. Preferably, that mixture is agitated. Preferably, the mixture is cooled to a temperature below 25° C., more preferably to a temperature below the PDT of the MCT ether powder; more preferably to a temperature that is 2° C. or more below the PDT of the MCT ether powder. Preferably, agitation is conducted until the MCT ether dissolves and forms a solution in a continuous liquid aqueous medium, thus forming solution (a). Preferably, solution (a) is homogeneous.

In the method of the present invention, solution (a) is subjected to a step (b) in which the MCT ether is separated from the water to produce dried MCT ether. Methods of separating MCT ether from the water in solution (a) may be classified as either "direct to powder" methods or as "indirect drying" methods. Direct-to-powder methods produce MCT ether in powder form without the need for significant mechanical stresses to break apart solid material that is not already in powder form. A preferred direct-to-powder method is spray drying. In spray drying, the solution (a) is passed through an atomizer or nozzle to produce droplets, which come into contact with gas. Preferably the gas is air at temperature above 25° C. The droplets lose water by evaporation and become powder particles. The powder particles produced by spray drying are optionally subjected to a fluidized bed.

A variety of indirect drying methods are suitable. Indirect drying methods produce dry MCT ether in a form that does not qualify as powder particles. The dry MCT ether may be, for example, in the form of beads too large to qualify as powder particles, in the form a solid mass or a collection of solid masses, in the form of a film on a substrate, in another form, or in a combination thereof. Preferred indirect drying methods are precipitation in hot water, precipitation in organic solvent, simple evaporation, and freeze drying.

To accomplish precipitation in hot water, the solution (a), at approximately 25° C., is slowly added to water that is kept at temperature above Tgel. Beads of gelled MCT ether form and are mechanically separated from most of the water. The gelled beads may then be homogenized. The gelled beads or the product of homogenizing the gelled beads is dried to form a film or a solid mass.

To accomplish precipitation in organic solvent, an organic solvent is identified that is miscible with water and that will not dissolve the MCT ether in amounts larger than 0.1 gram of MCT ether per 100 g of water at 25° C. A preferred organic solvent is acetone. Solution (a) at approximately 25° C. is added to acetone, and gelled beads of MCT ether form. The gelled beads are separated from most of the fluid in the mixture. The gelled beads may then be homogenized. The gelled beads or the product of homogenizing the gelled beads is dried to form a film or a solid mass.

To accomplish simple evaporation, an open container of solution (a) is placed in an atmosphere of air at temperature of 30° C. to 95° C. and the water is allowed to evaporate. Typically a film forms on the surface of the container, and the film is mechanically removed from the container; removal of the film normally involves breaking the film into multiple pieces.

To accomplish freeze drying, solution (a) is cooled to a temperature low enough to freeze the solution (a). The frozen solution (a) is then subjected to a sublimation pressure below 1 atmosphere and to a sublimation temperature. The sublimation temperature and sublimation pressure are chosen so that water leaves the frozen solution (a) by a process of sublimation. The material may then optionally be subjected to further drying processes. Freeze drying normally produces a sheet of dry MCT ether.

Indirect drying methods produce dry MCT ether in forms that have one or more dimension too large to qualify as powder. Such forms are preferably subjected to mechanical stress to reduce the size to then qualify as powder. Preferred mechanical stress is one or more milling process, one or more grinding process, or a combination thereof. In some embodiments, the dry MCT ether is first subjected to milling with a rotating metal beater (a process also called impact grinding), followed by subjecting the resulting material to finer milling by a mill using one or more of temperatures below 25° C., centrifugal milling, ball milling, cyclone milling, disk milling, other techniques, or a combination thereof.

Preferably, the MCT ether in powder form has volume-average particle diameter of 10 to 500 μm.

It is considered that one advantage of the method of present invention is that the method of the present invention is preferably used to convert a never-hydrolyzed MCT ether in powder form that has an undesirably low PDT to an MCT ether in powder form that has the same chemical composition but has a higher PDT. While the present invention is not limited to any specific theory, it is contemplated that the conversion is accomplished by altering the crystal structure of the MCT ether.

The following example serves to illustrate the advantage provided by the method of the present invention. For example, a manufacturer of food products may wish to incorporate into a food product an MCT ether that has Tgel of approximately 36° C. One reason for incorporating such an MCT ether into the food product is the intent that gelation of the MCT ether inside the body of the eater at 37° C. would cause a feeling of fullness, thus discouraging the eater from over-eating. However, in the past, some previously-known MCT ethers having Tgel of approximately 36° C. are only available as powders that have PDT so low that dissolving them in water requires cooling the water below 25° C., which requires refrigeration equipment. Incorporating the MCT ether into the food product normally involves dissolving the MCT ether in water. Thus, in the past, the food manufacturer would have often found that using a desired MCT ether was associated with the disadvantage of the need to employ refrigeration equipment.

In the future, an example of a way in which the food manufacturer could benefit from the present invention is as follows. The food manufacturer could obtain MCT ether in powder form that was made by the process of the present invention (a "new" MCT ether powder). Such MCT ether in powder form would, it is contemplated, have higher PDT that the PDT of an MCT ether powder of the same chemical composition that had not been made by the process of the present invention (an "old" MCT ether powder). When the food manufacturer would then dissolve the MCT ether in water, it would be apparent that the new MCT ether powder would require less refrigeration during the dissolution process than the old MCT ether powder had required. In some cases, the new MCT ether powder would not require any refrigeration at all during the dissolving process conducted by the food manufacturer. Thus it would be easier for the food manufacturer to incorporate the new MCT ether into the food product. Because it is contemplated that the chemical composition of the MCT ether is unchanged by the method of the present invention, it is expected that the properties inherent in the MCT ether molecule, such as Tgel, would remain unchanged.

Among MCT ethers, methylcellulose is preferred. Among methylcelluloses, preferred are those in which hydroxy groups of anhydroglucose units are substituted with methyl groups such that s23/s26 is 0.36 or less, more preferably 0.33 or less, more preferably 0.30 or less, more preferably 0.27 or less, and more preferably 0.24 or less. Among methylcelluloses, preferably s23/s26 is 0.08 or more, more preferably 0.10 or more, more preferably 0.12 or more, more preferably 0.17 or more, more preferably 0.18 or more, more preferably or 0.19 or more, more preferably 0.20 or more; and more preferably 0.21 or more. In the case of more than one methylcellulose having such s23/s26 ratio, the weight ranges and weight ratios relating to methylcellulose relate to the total weight of all methylcelluloses wherein s23/s26 is 0.36 or less.

Preferred methylcellulose in powder form that is produced by the method of the present invention is distinguished from never-hydrolyzed methylcellulose by features of the powder x-ray diffraction spectrum. The powder x-ray diffraction spectrum may be obtained using a theta-theta diffractometer with a CoKα1 source ($\lambda=1.789$ Å) at 30 kV and 50 mA.

Methylcellulose powder that has been made by the process of the present invention shows a peak (herein Peak II) in the powder x-ray diffraction spectrum using source x-ray wavelength of 1.789 Å at a 2θ value of between 14.5 and 16.5 degrees. In contrast, never-hydrolyzed methylcellulose powder x-ray diffraction spectrum using source x-ray wavelength of 1.789 Å does not show such a peak in the above mentioned 2θ range of 14.5 to 16.5 degrees. Methylcellulose that has been made by the process of the present invention also shows a trough (herein Trough II) at a 2θ value between 16.51 and 20 degrees.

The prominence of peak II may be characterized as follows. The intensity level of peak II (Ipeak) is determined as follows. The maximum point of peak II is determined, and that point has a 2θ value (2θpII) and a total intensity value (Ipeak). Ipeak is the quantity shown as item 1 in FIG. 2. The minimum point of trough II is determined, and that point has a 2θ value (2θtII) and a total intensity value (Itrough).

Figure 2:
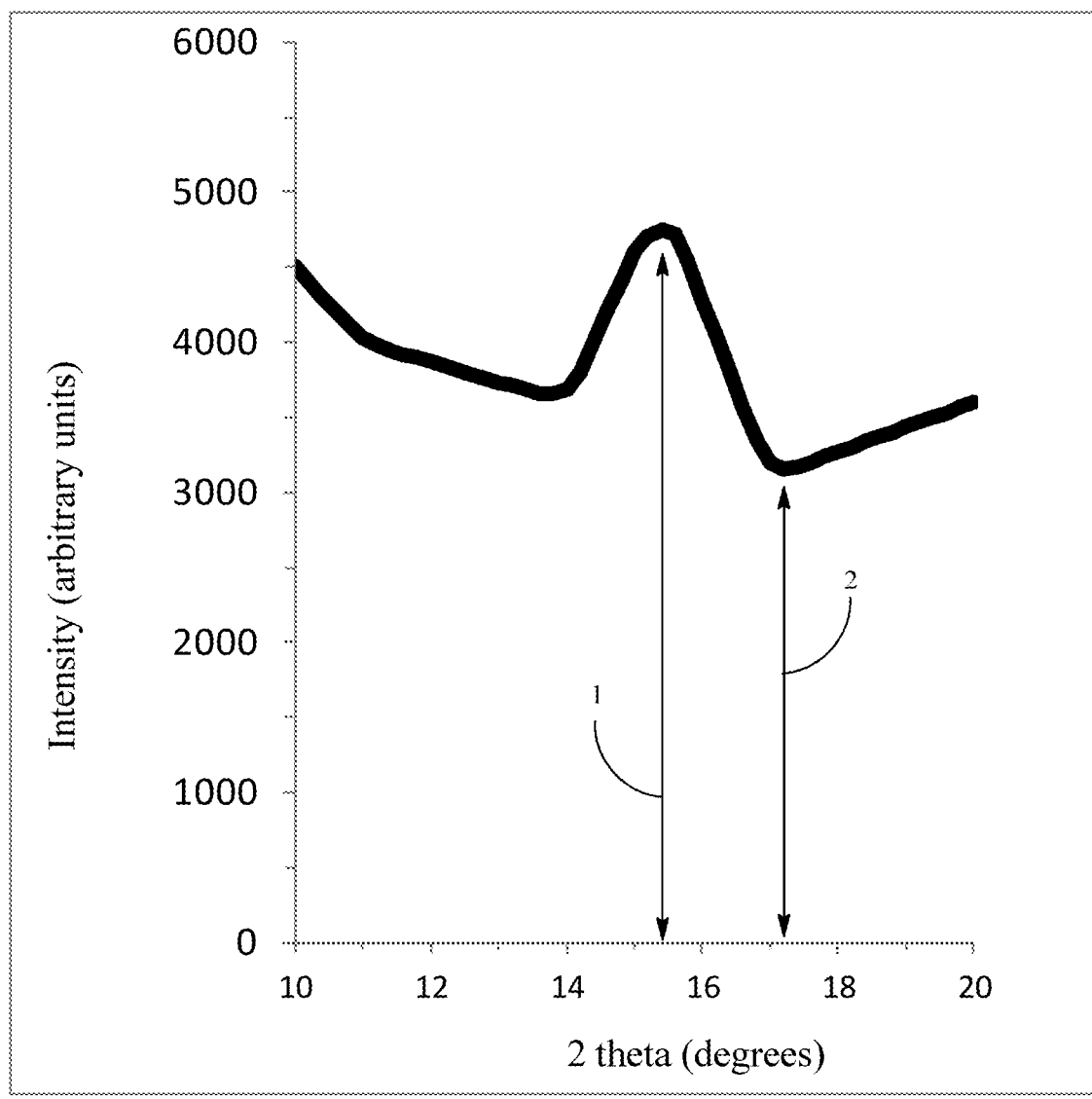

Itrough is the quantity shown as item 2 in FIG. 2. The prominence of peak II is then characterized by the Peak Index (PIndex) as follows:

PIndex=(Ipeak−Itrough)/Itrough

When no peak II is present, PIndex is reported as "no peak."

Preferably, methylcellulose of the present invention shows PIndex of 0.01 or greater; more preferably 0.1 or greater; more preferably 0.2 or greater; more preferably 0.3 or greater.

Preferably, MCT ether in powder form made by the process of the present invention has higher PDT than never-hydrolyzed ether of the same chemical composition. The difference in PDT may be characterized by ΔPDT, as follows:

ΔPDT=(PDT of invention powder)−(PDT of never-hydrolyzed MCT ether)

Preferably, ΔPDT is 0.15° C. or greater; more preferably 0.5° C. or greater; more preferably 3° C. or greater; more preferably 5° C. or greater; more preferably 7° C. greater.

The following are examples of the present invention.

The following MCT ethers were used. The abbreviation "approx" means "approximately."

| Label | Type | 2% Solution viscosity at 5° C. | s23/s26 |
|---|---|---|---|
| MC-1 | NH-MC* | 5030 mPa*s | 0.38 |
| MC-2 | NH-MC* | 4980 mPa*s | 0.39 |
| MC-3 | NH-MC* | 9740 mPa*s | 0.27 |
| MC-4 | NH-MC* | 5280 mPa*s | 0.20 |

*never-hydrolyzed methylcellulose

MC-4 was made using the methods described in U.S. Pat. No. 8,623,840.

Powder Dissolution Temperature (PDT) was assessed as described herein above, using a Haake RS1™ rheometer.

Solutions of NH-MC samples were made as follows. Solutions were 2% by weight of methylcellulose, based on the weight of the solution. NH-MC was milled, ground, and dried. Then 3 g of NH-MC was added to 147 g of tap water at 20-25° C. with stirring by overhead impeller stirrer. Impellers had 2 cm wings. Rotation rate was 750 rpm. The mixture was cooled to a temperature of less than 2° C. in an ice bath and this temperature was kept below 2° C. while continuing stirring at 750 rpm for 180 min. This solution was then stored in a refrigerator overnight. After the storage overnight, before any subsequent use or analysis, the solution was stirred for 15 min at 100 rpm in an ice bath.

Spray Drying was conducted as follows. 1500 ml of NH-MC solution as kept at 20° C. overnight. A Büchi Mini-Spray Dryer B290 was used. Air stream was heated to 150° C., aspirator was set to 100%, pump flow to 35%, at maximum spray flow.

Precipitation in hot water was conducted as follows. 1500 mL of NH-MC solution was added drop-wise (0.4 g solution per drop) into hot water (95° C.) while stirring at 250 rpm. After the material was fully gelled the stirring was stopped so that the gelled beads did sink to the bottom of the vessel. The supernatant liquid was discarded, and the remaining hot gel beads were homogenized using an Ultra-Turrax homogenizer for 30 s. The homogenized hot gel mass was placed in a drying oven at 65° C. over night. The product was cut into small pieces using a IKA A11 Basic mill and then ground to a powder with a cryomill (Retsch ZM100).

Precipitation in Acetone was conducted as follows. 1500 mL of NH-MC solution were added drop-wise (0.4 g solution per drop) into acetone while stirring at 250 rpm at approximately 23° C. After the material was fully precipitated the stirring was stopped so that the precipitated beads did sink to the bottom of the vessel. The supernatant liquid was discarded, and the remaining hot gel beads were homogenized using an Ultra-Turrax homogenizer for 30 s. The homogenized hot gel mass was placed in a drying oven at 65° C. over night. The product was cut into small pieces using a IKA A11 Basic mill and then ground to a powder with a cryomill (Retsch ZM100).

Simple evaporation was conducted as follows. 250 mL of NH-MC solution were placed in an open beaker (diameter 30 cm) in a drying oven at 40° C. After the water was fully evaporated a film was obtained. The film was cut into small pieces using a IKA A11 Basic mill and then ground to a powder with a cryomill (Retsch ZM100).

Powder x-ray diffraction spectra were measured and analyzed as described above, using a Bruker D8 ADVANCE™ instrument with the Vantec detector.

Results were as follows. The abbreviation "ppt" means "precipitated."

MC-1 Results

| Sample | PDT (° C.) | PIndex |
|---|---|---|
| never hydrolyzed | 26.7 | no peak |
| simple evaporation | 26.9 | 0.02 |
| spray drying | 29.9 | 0.33 |

MC-2 Results

| Sample | PDT (° C.) | PIndex |
|---|---|---|
| never hydrolyzed | 30.3 | no peak |
| ppt in hot water | 30.5 | 0.09 |
| ppt in acetone | 30.7 | 0.14 |

MC-3 Results

| Sample | PDT (° C.) | PIndex |
|---|---|---|
| never hydrolyzed | 17.1 | no peak |
| ppt in acetone | 20.7 | 0.24 |
| ppt in hot water[1] | 21.9 | 0.22 |
| ppt in hot water[2] | 23.0 | 0.27 |

[1] 0.4 gram of solution per drop, added to hot water
[2] 0.8 gram of solution per drop, added to hot water MC-4 Results

| Sample | PDT (° C.) | PIndex |
|---|---|---|
| never hydrolyzed | 6.7 | no peak |
| ppt in acetone | 14.7 | 0.68 |
| ppt in hot water | 18.1 | 0.74 |

-continued

| Sample | PDT (° C.) | PIndex |
|---|---|---|
| spray dried[3] | 20.50 | 0.52 |
| spray dried[4] | 21.0 | 0.56 |

[3] solution was prepared at 5° C.
[4] solution was prepared at 1.5° C.

In all the tests, the method of the present invention caused the PDT to increase and caused the appearance of peak II in the powder x-ray diffraction spectrum. Among the methods, spray drying appeared to be the most effective. Among the samples of methylcellulose, MC-4 showed the greatest increase in PDT and the most prominent peak II.

The invention claimed is:

1. A method of making methylcellulose-type ether in powder form, said method comprising
  (a) providing a solution of said methylcellulose-type ether in water,
    wherein the methylcellulose-type ether is selected from the group consisting of methyl cellulose polymer and hydroxyalkyl methylcellulose polymers,
    wherein the methylcellulose-type ether is present in the solution in an amount of 0.2% to 15% by weight based on the weight of the solution,
    wherein the molecules of the methylcellulose-type ether are intimately mixed with the molecules of an aqueous medium
    wherein the aqueous medium comprises 75% or more water by weight based on the weight of the aqueous medium,
    wherein the solution behaves as a liquid, and
  (b) then separating said methylcellulose-type ether from said water to produce dried methylcellulose-type ether, with the proviso that either
    (i) step (b) produces said methylcellulose-type ether in powder form, or
    (ii) after step (b), said method additionally comprises a step (c) of subjecting said dried methylcellulose-type ether to mechanical stress to produce said methylcellulose-type ether in powder form.

2. The method of claim 1 wherein said step (b) comprises spray drying said solution to produce said methylcellulose-type ether in powder form.

3. The method of claim 1, wherein said dried methylcellulose-type ether at the conclusion of step (b) is not in powder form, and wherein said method comprises, after step (b), the step (c) subjecting said dried methylcellulose-type ether to mechanical stress to produce said methylcellulose-type ether in powder form.

4. The method of claim 1, wherein said methylcellulose-type ether, prior to said step (a) has powder dissolution temperature in water of 25° C. or lower.

5. The method of claim 1, wherein said solution of methylcellulose-type ether in water is made by process comprising
  (x) providing an initial portion of methylcellulose-type ether in powder form that has never been dissolved in water, and
  (y) dissolving said initial portion of methylcellulose-type ether in powder form in water to form said solution of methylcellulose-type ether in water.

* * * * *